July 30, 1957 W. A. HOSMER 2,800,935

SLAB-DEBARKING ROTOR HAVING CUSHIONS TO LIMIT RETURN SWING OF HAMMERS TO BARK-IMPACTING POSITION

Filed June 6, 1955 4 Sheets-Sheet 1

Inventor
Windsor Arnold Hosmer
by Roberts Cushman & Grover
Attorneys

July 30, 1957 W. A. HOSMER 2,800,935

SLAB-DEBARKING ROTOR HAVING CUSHIONS TO LIMIT RETURN SWING OF HAMMERS TO BARK-IMPACTING POSITION

Filed June 6, 1955 4 Sheets-Sheet 2

Inventor
Windsor Arnold Hosmer
by Roberts Cushman & Grover
Attorneys

Inventor
Windsor Arnold Hosmer
by Roberts Cushman & Grover
attorneys

July 30, 1957 W. A. HOSMER 2,800,935

SLAB-DEBARKING ROTOR HAVING CUSHIONS TO LIMIT RETURN SWING OF HAMMERS TO BARK-IMPACTING POSITION

Filed June 6, 1955 4 Sheets-Sheet 4

Inventor
Windsor Arnold Hosmer
by Roberts, Cushman & Grover
Attorneys

United States Patent Office
2,800,935
Patented July 30, 1957

2,800,935

SLAB-DEBARKING ROTOR HAVING CUSHIONS TO LIMIT RETURN SWING OF HAMMERS TO BARK-IMPACTING POSITION

Windsor Arnold Hosmer, Belmont, Mass.

Application June 6, 1955, Serial No. 513,485

11 Claims. (Cl. 144—208)

This invention relates to a method and apparatus for debarking pieces of wood, such as logs and slabs, and involves improvements on the invention disclosed in my copending application Serial No. 302,773, filed August 5, 1952, this being a continuation-in-part of said application.

Objects of the invention are to provide a debarking machine which will thoroughly and rapidly debark either hardwood or softwood, which will thoroughly debark pieces having knots and other irregular contours, which will debark a plurality of pieces in parallel, which is simple and economical in construction and which is durable and reliable in use.

In one aspect the machine comprises a rotor having unitary hammers pivotally mounted on its periphery to swing about axes parallel to its axis and to project radially therefrom in response to centrifugal force, each hammer having on the leading side of its outer end an impact surface for striking pieces of wood, together with means to transport the pieces lengthwise past the rotor along a path close enough to the rotor so that all the hammers can substantially reach the pieces irrespective of the contour of the pieces, the hammers striking the pieces in different angular positions depending on the contour of the pieces, and the impact surfaces being so curved that at the moment of impact the surface of a piece is approximately tangent to each curved surface in each of said angular positions. When the hammer projects radially from the rotor the curved impact surface should be approximately tangent to a radius of the rotor at its inner end and substantially perpendicular to a radius of the rotor at its outer end. Also the curved impact surface should be located largely in front of a plane containing the axis of the rotor, the axis of the hammer and the center of gravity of the hammer when it projects radially in response to centrifugal force. For softwood the impact surfaces of the hammers are preferably flat transversely so as to loosen the bark without damaging the underlying wood, but for hardwood the impact surfaces should be beveled to form wedges each having a central apex edge which moves in a plane substantially parallel to the length of the piece of wood and wedges the bark sidewise in opposite directions.

In another aspect the rotor comprises a series of plates disposed transversely of its axis, the plates having radial projections or arms carrying pins to which the hammers are pivoted. Preferably the projections from alternate plates extend in one radial direction and the projections from the intermediate plates extend in another radial direction to provide spaces between the projections for the hammers. Thus each plate which is intermediate the two plates between which a hammer is pivoted, lies coplanar with the hammer and is so shaped that it provides a recess to receive the inner end of the hammer. In the preferred embodiment the aforesaid spaces are arranged in rows extending lengthwise of the rotor and the spaces of each row are staggered with respect to the spaces of other rows. Thus one set of alternate plates support the hammers of one row and the intermediate plates support the hammers of another row. The width of the hammers should be such that, by virtue of the staggered arrangement the hammers strike the pieces throughout substantially the entire length of the rotor, and the pieces are fed past the rotor at such speed that they receive impacts throughout substantially their entire surfaces. In the preferred embodiment each plate has two arms projecting radially in different directions with the arms of alternate plates extending in different radial directions and the arms of every other plate disposed in a row parallel to the rotor axis to provide pairs of spaces therebetween, a hammer being pivotally mounted in one space of each pair and spacing means extending across the other space of each pair, succeeding hammers lengthwise of the rotor being located in different rows.

In still another aspect the machine comprises cushion stops on the rotor yieldingly to limit the swing of the hammers forwardly in the direction of rotation. Preferably the hammers are pivoted intermediate their ends and the cushion stops are associated with the inner ends of the hammers. In the preferred embodiment the aforesaid plates have opposed recesses and the cushion stops are mounted in the recesses.

In yet another aspect the machine comprises a carrier for transporting pieces of wood past the rotor in the direction in which the glancing blows of the hammers tend to advance the pieces. For best results the carrier should comprise a belt made of rubber or other elastic material sliding over a continuous backing. On the side of the pieces opposite to the carrier, rollers are provided to hold the pieces against the carrier as they approach and leave the rotor. The rollers are preferably divided into sections which can ride over the pieces independently of each other.

The rotor should be mounted on a support which is movable away from the carrier to permit the rotor to ride over large protuberances on the pieces of wood, and the support is preferably pivotally mounted for this purpose.

For the purpose of illustration a typical embodiment of the invention is shown in the accompanying drawings in which.

Figure 1:
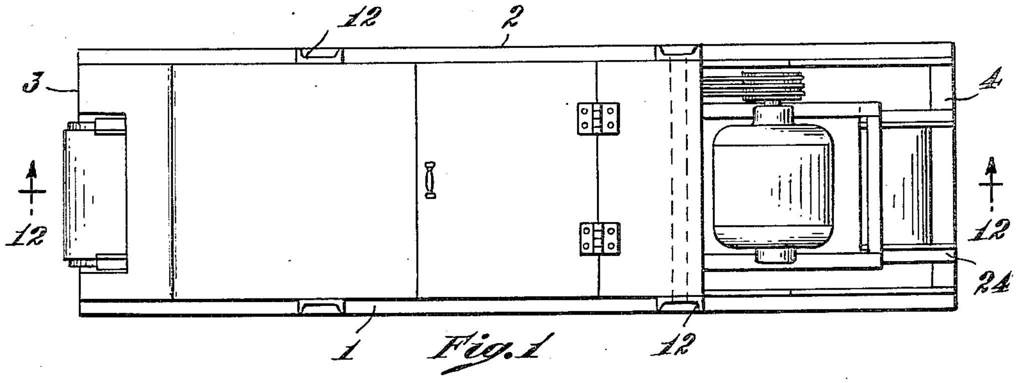
Fig. 1 is a plan view.

The particular embodiment of the invention chosen for the purpose of illustration comprises a frame including slides 1 and 2, ends 3 and 4, a top 6, a door 7 in the top, a bed plate 8 supported on cross beams 9 resting on angle irons 11 secured to the sides, uprights 12 secured to the outside of the sidewalls and base strips 13 interconnecting the sides, ends and uprights. A rubber belt 14 is trained around rollers 16 and 17 and slides on the bed 8, the roller 16 being driven by a motor 18 through a speed reducer 19.

Figure 2:
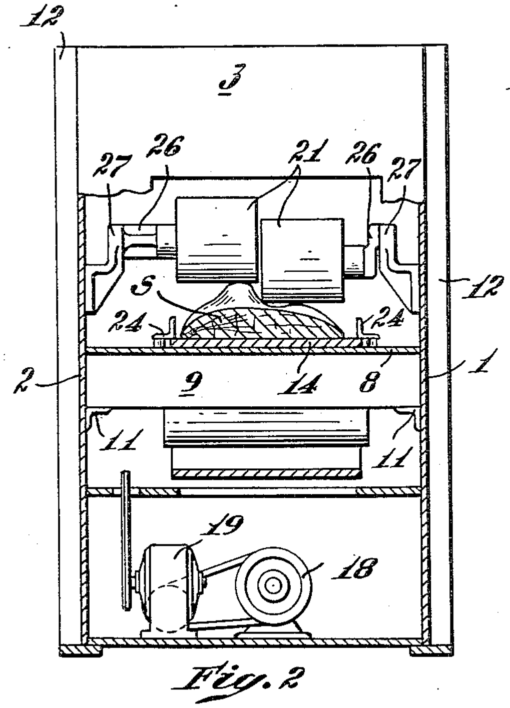
Fig. 2 is a transverse vertical section on line 2—2 of Fig. 12 showing the outfeed hold-down rollers.
Figure 3:
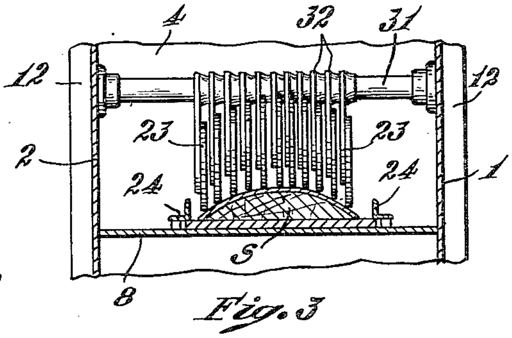
Fig. 3 is a transverse vertical section on line 3—3 of Fig. 12 showing the infeed hold-down rollers.
Figure 12:
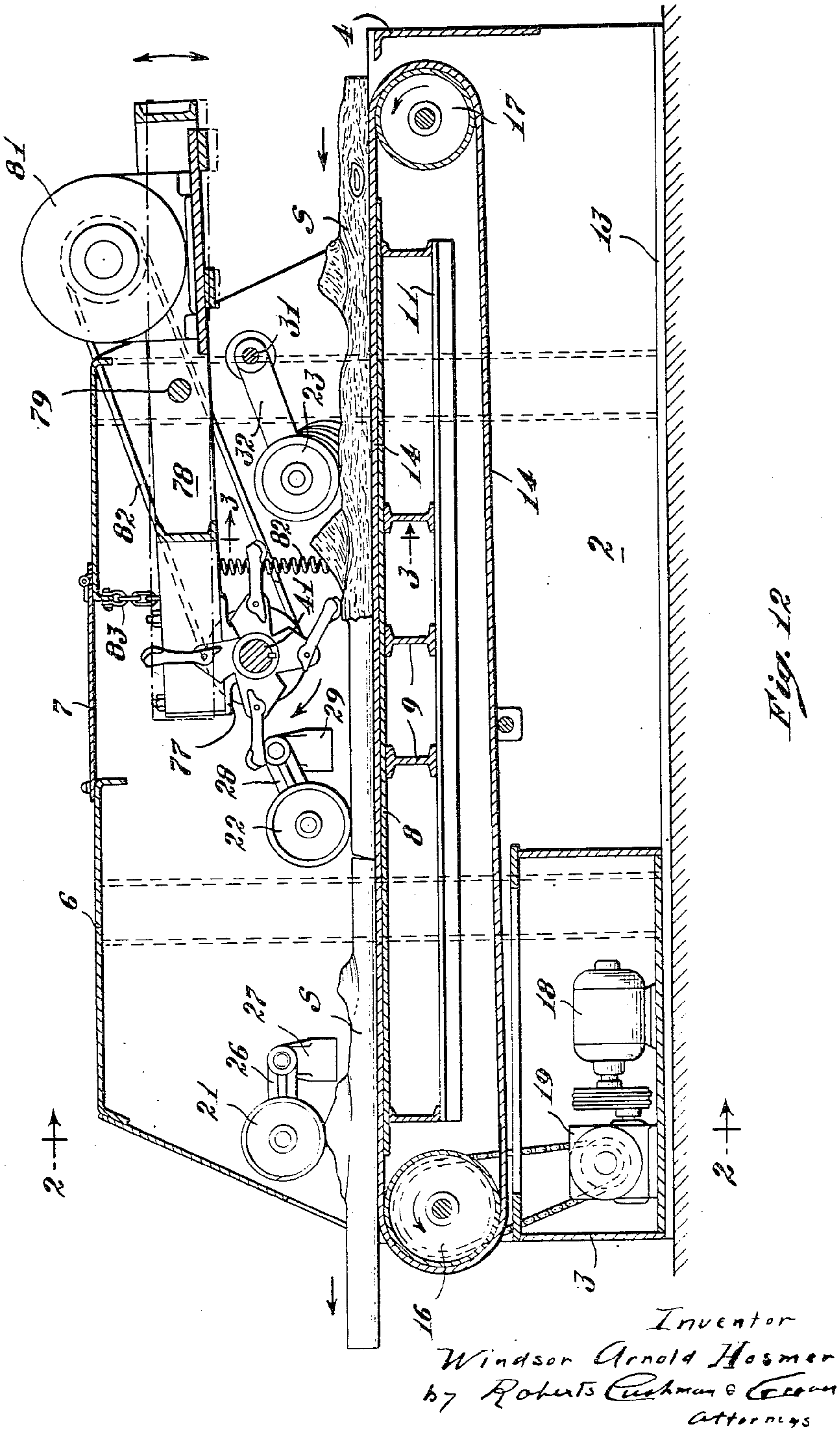
Fig. 12 is a longitudinal central vertical section on the line 12—12 of Fig. 1.

Slabs of wood S are fed through the machine by the belt 14 in the direction indicated by the arrows in Fig. 12. The slabs are held down against the belt by three sets of rollers 21, 22 and 23 and the margins of the belt are held down against the bed 8 by guides 24 (Figs. 1, 2 and 3). The rollers 21 are mounted on arms 26 which are pivoted on brackets 27 fast to the sidewalls so that they can rise and fall in accordance with the contour of the slabs. The hold-down rollers 22 are similarly mounted on arms 28 pivoted to brackets 29. The hold-down rollers 23 at the entrant end of the machine, which are narrower and greater in number, are pivotally mounted on a shaft 31 through the medium of arms 32. Thus the slabs are held firmly against the belt 14 as they are fed through the machine.

The aforesaid rotor comprises four different kinds of plates 36, 37, 38 and 39 fitting over a shaft 41 and held in predetermined angular positions by means of a spline 42 fitting in recesses 43 in the plates. The plates are held in abutting relationship by means of nuts 44 threaded on the ends of the shafts, lock washers 46 and spacer rings 47.

Figure 7:
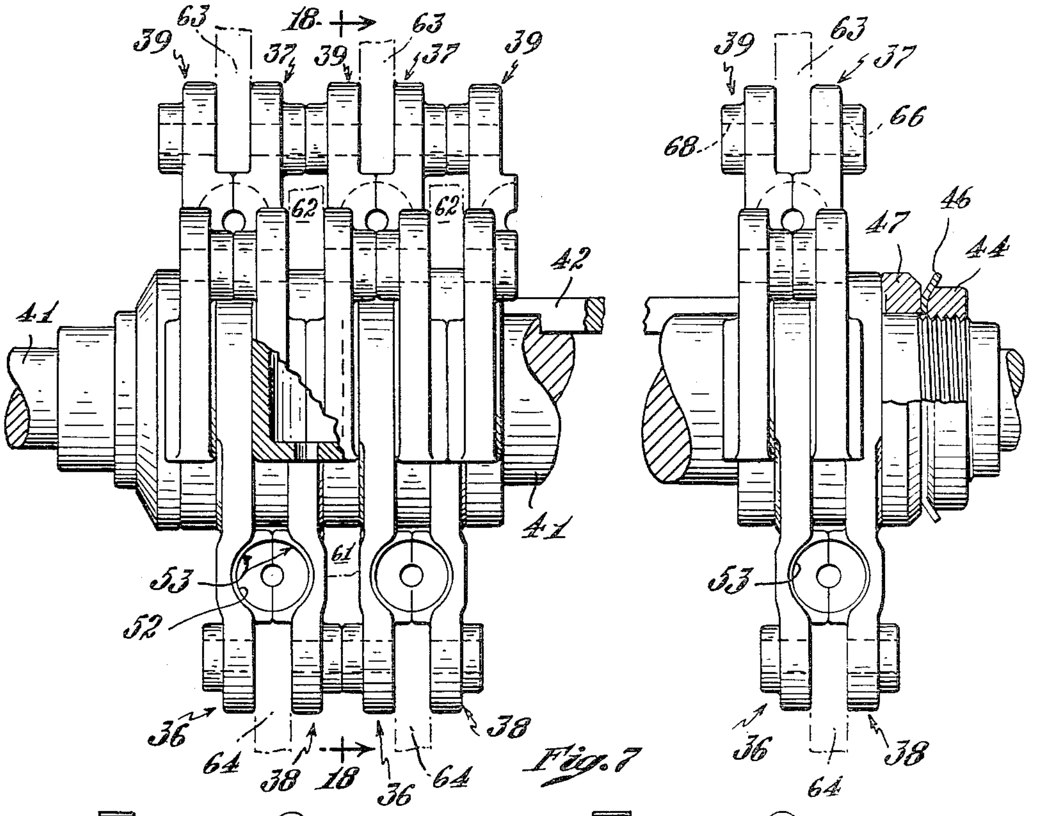
Fig. 7 is a side view of the rotor with parts broken away and parts omitted.
Figure 16:
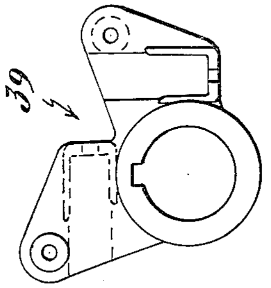
Figs. 13, 14, 15 and 16 are end views of the four different kinds of rotor plates.
Figure 15:
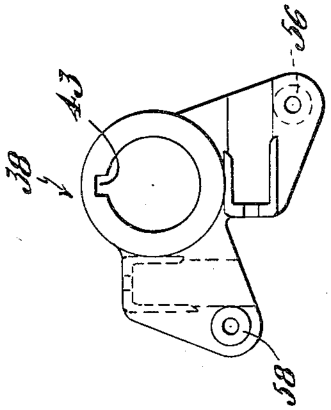
Figure 14:
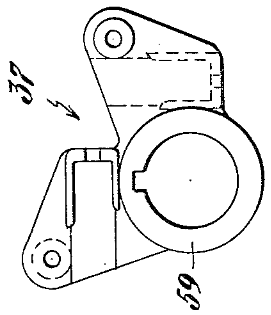
Figure 13:
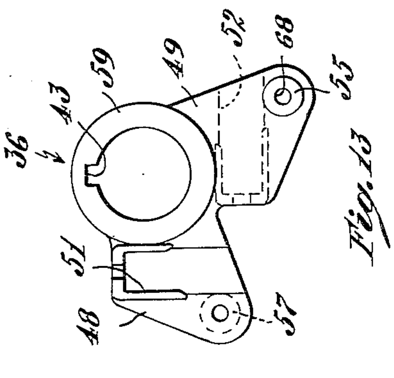
Figures 17, 18:
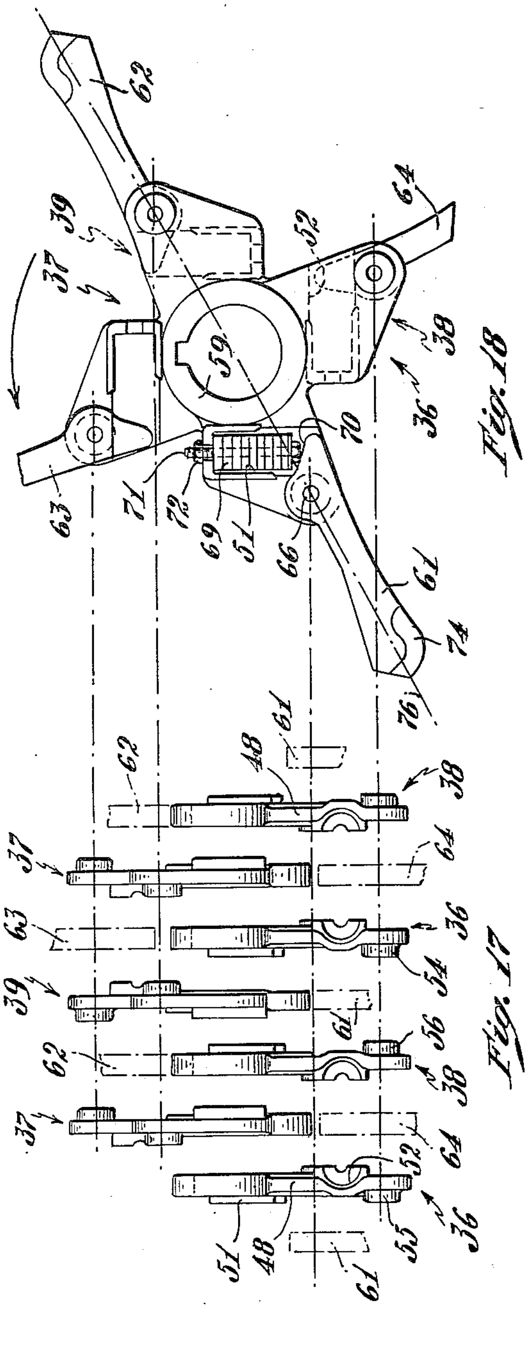
Fig. 17 is an exploded view of the rotor plates in the relative positions which they occupy when the rotor is assembled and shows the plates of Figs. 13 to 16 as they would appear if each plate were viewed from the right in its respective figure.
Fig. 18 is an end view corresponding to Figs. 13 to 16 and showing the rotor plates assembled.

Each plate comprises two arms 48 and 49 spaced 90° around the axis of the rotor. As shown in Figs. 13 and 15 the arms of plates 36 and 38 extend in the same directions and as shown in Figs. 14 and 16 the arms of plates 37 and 38 extend in the opposite directions. Each of the plates has on one side of one arm a semi-cylindrical recess 51 and on the other side of the other arm a similar recess 52 (Fig. 13). As shown in Figs. 7 and 17 these plates are mounted on the shaft in the order of 36, 37, 38, 39, 36 etc. Thus the recesses 51 and 52 of alternate plates face each other to form cylindrical sockets 53 (Fig. 7) to receive cushion washers to be described hereinafter. Integral with each arm of each plate on the side opposite the recess is a boss which abuts a corresponding boss on the opposed arm of the second succeeding plate. For example the boss 55 on the arm 49 abuts boss 56 on the corresponding arm of plate 38 (Figs. 7, 13 ,15 and 17) and the boss 57 on the arm 48 engages a corresponding boss 58 on the corresponding arm of plate 38 (Figs. 13 and 15). The plates also abut each other at the surfaces 59 (Figs. 13, 15, 17 and 18). Thus adjacent plates bear on each other at the surfaces 59 and alternate plates abut each other at the bosses 55 to 58 and also around the edges of the recesses 51 and 52.

Figure 11:
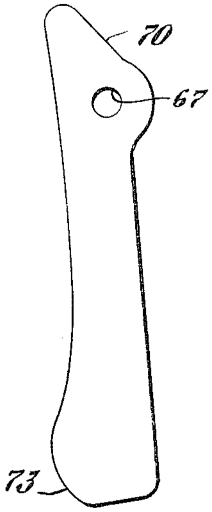
Fig. 11 is a side view of the hammer shown in Fig. 10.

Between alternate plates adjacent the cushion sockets 53 are spaces to receive the aforesaid hammers which are disposed in four rows extending lengthwise of the rotor 90° apart. In Fig. 18 the hammers extending to the left are numbered 61, those to the right 62, those extending upwardly 63 and those extending downwardly 64, and in Figs. 7 and 17 the hammers are correspondingly numbered. Progressing lengthwise of the rotor the hammers succeed each other in the order 61, 63, 64, 62, 61 etc. (Fig. 17). The hammers are pivoted between the plate arms by means of pins 66 extending through openings 67 in the hammers and openings 68 in the arms which are coaxial with the bosses 57 and 58. Mounted in the sockets 53 are cushions comprising a stack of rubber rings 69 held in place by a bolt 71 and nut 72 (Fig. 18). The inner ends of the hammers have surfaces 70 (Figs. 9, 11 and 18) engaging the head of the bolts 71 upon return to their radial positions and compressing the elastic rings 69, thereby yieldingly to limit the extent to which the hammers can swing forwardly in the direction of rotation of the rotor. As shown in Figs. 7 and 13 to 18 each cushion socket is closed throughout its entire periphery and, with the plunger 71 filling the small opening in the bottom of the socket, it is also closed at the bottom so that the cushion is confined on all sides.

As shown in Figs. 5, 9, 11 and 18 the forward or leading side of the outer end of each hammer is curved and, when the hammer projects radially from the rotor, the inner end of the curve extends approximately tangent to one radius of the rotor and the outer end of the curve extends substantially perpendicular to another radius of the rotor, for example, that radius which corresponds to a dot-and-dash line 76 in Fig. 18. For debarking softwood these surfaces preferably extend substantially parallel to the axis of the rotor transversely of the hammers as shown at 73 in Figs. 10 and 11. However for debarking hardwood the impact surfaces are preferably beveled transversely as shown at 74 in Figs. 8, 9 and 18. In either case the impact surfaces should be located largely in front of a plane containing the axis of the rotor, the axis of the hammer and the center of gravity of the hammer as indicated by the dot-and-dash line 76 in Fig. 18.

Figure 5:
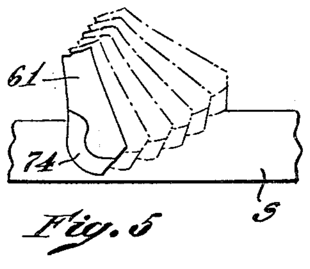
Figs. 5 and 6 are detail views showing the positions of the hammers when they impact a piece of wood.
Figure 6:
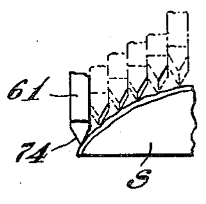

As shown in Fig. 12 the rotor shaft 41 is journaled in inverted bearing blocks 77 fast to the underside of a support 78 pivotally mounted on a shaft 79. Mounted on the outer end of the support 78 is a motor 81 which drives the rotor in the direction shown by the arrow through the medium of a belt 82. The relative weights of the parts carried by the platform 78 are preferably such that it tends to swing in a clockwise direction, but the tendency is counteracted by a tension spring 82. The extent to which the spring 82 can rotate the platform in a counterclockwise direction is limited by a chain stop 83 whose length is such that the rotor hammers cannot quite reach the belt 14 when there is no slab between the rotor and belt. As slabs are fed through in the direction of the arrows in Fig. 12 the hammers strike the slabs glancing blows at locations along the curved impact surfaces of the hammers depending upon the thickness of the slab at the location of impact. After the hammers leave the slabs they swing forwardly in response to centrifugal force to the radial positions shown in Fig. 18 where they are yieldingly checked by the cushions 69. The different angles at which the hammers strike the slabs, depending upon the thickness of the slab, is illustrated in Figs. 5 and 6.

Figure 4:
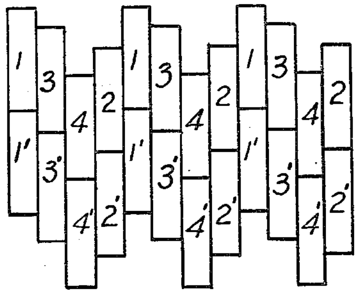
Fig. 4 is a pattern of the impacts of the hammers on a piece of wood.
Figure 8:
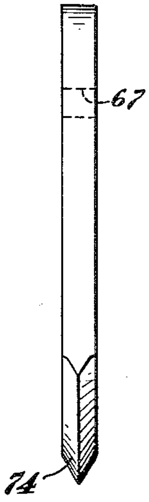
Fig. 8 is an elevation of the leading side of one of the hammers.
Figure 9:
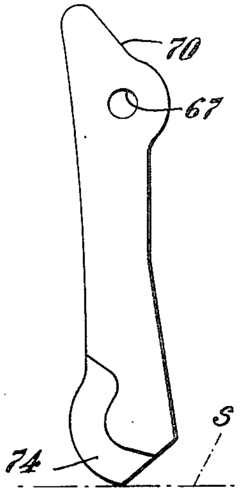
Fig. 9 is a side view of the same hammer.
Figure 10:
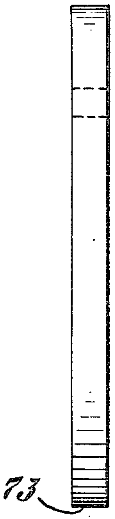
Fig. 10 is an elevation of the leading side of another hammer.

The pattern of impact of the hammers on the stock is illustrated in Fig. 4 where the areas 1 are the locations impacted by the row of hammers 61 (Fig. 18), the areas 3 are the locations impacted by the following row of hammers 63, the areas 2 are the locations impacted by the next row of hammers 62, the areas 4 are the locations impacted by the last row of hammers 64, the areas 1' are the locations impacted by the first row 61 during the next rotation, and so on. It should be noted that the hammer 64, although following the hammer 62 timewise, strikes that area of bark located between the areas 2 and 3. Thus the entire area of the stock is covered and the impacts are distributed in such sequence as to remove the bark thoroughly, the sequence being particularly effective when using beveled hammers such as shown in Figs. 8 and 9.

It should be understood that the present disclosure is for the purpose of illustration only and that this invention includes all modifications and equivalents which fall within the scope of the appended claims.

I claim:

1. A debarking machine comprising a rotor having unitary hammers pivotally mounted on its periphery to swing in planes perpendicular to its axis and to project radially therefrom in response to centrifugal force about axes intermediate their inner and outer ends, the rotor having a cushion socket behind the inner end of each hammer, and a cushion in each socket yieldingly to stop swinging movement of the hammer, said socket being closed at the bottom and around its periphery so that said cushion is confined on all sides.

2. A debarking machine comprising a rotor having unitary hammers pivotally mounted on its periphery to swing in paths perpendicular to its axis and to project radially therefrom in response to centrifugal force about axes intermediate their inner and outer ends, the rotor having a cushion socket behind the inner end of each hammer, the socket being cylindrical and having its axis in line with the inner end of the hammer when the hammer projects radially as aforesaid, and a cushion in each socket yieldingly to limit return swing of the hammer to its radial position.

3. A debarking machine comprising a rotor having unitary hammers pivotally mounted on its periphery to swing in paths perpendicular to its axis and to project radially therefrom in response to centrifugal force about axes intermediate their inner and outer ends, the rotor having a cushion socket behind the inner end of each hammer, a cushion in each socket yieldingly to limit return swing of the hammer to its radial position, and a striker interposed between the hammer and cushion to distribute the blows of the hammer's inner end over the end of the cushion.

4. For debarking a piece of wood, a machine comprising a carrier for transporting such piece along a predetermined path, a rotor having its axis extending transversely of the path at one side thereof, hammers pivotally mounted on the periphery of the rotor to swing about axes parallel to its axis and to project radially therefrom in response to centrifugal force, the distance between said path and axis being such that the hammers strike such piece glancing blows as it is transported past the rotor by the carrier, the rotor having a series of recesses disposed in rows extending lengthwise of said axis to receive the pivoted ends of the hammers and the recesses of each row being staggered with respect to the recesses of other rows, the rotor also having a cushion socket behind the inner end of each hammer, and a cushion in each socket yieldingly to limit return swing of the hammer to its radial position.

5. For debarking a piece of wood, a machine comprising a carrier for transporting such piece along a predetermined path, a rotor having its axis extending transversely of the path at one side thereof, and hammers pivotally mounted on the periphery of the rotor to swing about axes parallel to its axis and to project radially therefrom in response to centrifugal force, the distance between said path and axis being such that the hammers strike such piece glancing blows as it is transported past the rotor by the carrier, the rotor having a series of recesses disposed in rows extending lengthwise of said axis to receive the pivoted ends of the hammers and the recesses of each row being staggered with respect to the recesses of other rows, the rotor also having a cushion socket behind the inner end of each hammer, and a cushion in each socket yieldingly to stop swinging movement of the hammer, said socket being closed at the bottom and around its periphery so that said cushion is confined on all sides.

6. For debarking a piece of wood, a machine comprising a carrier for transporting such piece along a predetermined path, a rotor having its axis extending transversely of the path at one side thereof, hammers pivotally mounted on the periphery of the rotor to swing about axes parallel to its axis and to project radially therefrom in response to centrifugal force, the distance between said path and axis being such that the hammers strike such piece glancing blows as it is transported past the rotor by the carrier, the rotor having a series of recesses disposed in rows extending lengthwise of said axis to receive the pivoted ends of the hammers and the recesses of each row being staggered with respect to the recesses of other rows, the rotor also having a cushion socket behind the inner end of each hammer, the socket being cylindrical and having its axis in line with the inner end of the hammer when the hammer projects radially as aforesaid, and a cushion in each socket yieldingly to limit return swing of the hammer to its radial position.

7. For debarking a piece of wood, a machine comprising a carrier for transporting such piece along a predetermined path, a rotor having its axis extending transversely of the path at one side thereof, hammers pivotally mounted on the periphery of the rotor to swing about axes parallel to its axis and to project radially therefrom in response to centrifugal force, the distance between said path and axis being such that the hammers strike such piece glancing blows as it is transported past the rotor by the carrier, the rotor having a series of recesses disposed in rows extending lengthwise of said axis to receive the pivoted ends of the hammers, and the recesses of each row being staggered with respect to the recesses of other rows, the rotor also having a cushion socket behind the inner end of each hammer, a cushion in each socket yieldingly to limit return swing of the hammer to its radial position, and a striker interposed between the hammer and cushion to distribute blows of the hammer's inner end over the end of the cushion.

8. A debarking machine comprising a rotor having unitary hammers pivotally mounted on its periphery to swing in planes perpendicular to its axis and to project radially therefrom in response to centrifugal force about axes intermediate their inner and outer ends, the rotor having a cushion socket behind the inner end of each hammer, a cushion in each socket yieldingly to limit return swing of the hammer to its radial position, and a striker interposed between the hammer and cushion to distribute blows of the hammer's inner end over the end of the cushion, each socket being wider than the associated hammer to accommodate a larger cushion, thereby to absorb the hammer blows more effectively.

9. For debarking a piece of wood, a machine comprising a carrier for transporting such piece along a predetermined path, a rotor having its axis extending transversely of the path at one side thereof, hammers pivotally mounted on the periphery of the rotor to swing about axes parallel to its axis and to project radially therefrom in response to centrifugal force, the distance between said path and axis being such that the hammers strike such piece glancing blows as it is transported past the rotor by the carrier, the rotor having a series of recesses disposed in rows extending lengthwise of said axis to receive the pivoted ends of the hammers, and the recesses of each row being staggered with respect to the recesses of other rows, the rotor also having a cushion socket behind the inner end of each hammer, a cushion in each socket yieldingly to limit return swing of the hammer to its radial position, and a striker interposed between the hammer and cushion to distribute blows of the hammer's inner end over the end of the cushion, each socket being wider than the associated hammer to accommodate a larger cushion, thereby to absorb said blows more effectively.

10. Apparatus for debarking pieces of wood comprising a rotor having recesses therein, the recesses being disposed in rows extending lengthwise of the rotor and the recesses of each row being staggered with respect to the recesses of another row, unitary hammers pivotally mounted in said recesses to swing about axes parallel to said axis and to project radially therefrom in response to centrifugal force, and means to transport such pieces past the rotor along a path close enough to the rotor so that substantially all the hammers can reach such pieces irrespective of the contour of such pieces, the rotor having a cushion socket behind the inner end of each hammer, a cushion in each socket yieldingly to limit return swing of the hammer to its radial position, and a striker interposed between the hammer and cushion to distribute blows of the hammer's inner end over the end of the cushion, each socket being wider than the associated hammer to accommodate a larger cushion, said recesses being disposed between planes perpendicular to the axis of the rotor with at least one recess between each pair of adjacent planes, the width of the recesses being substantially equal to the distance between planes and the width of the hammers being substantially equal to that of the recesses so that the hammers strike such pieces throughout substantially the entire length of the rotor, and the inner end of each hammer may be as wide as its outer end.

11. For debarking a piece of wood, a machine comprising a carrier for transporting such piece along a predetermined path, a rotor having its axis extending transversely of the path at one side thereof, hammers pivotally mounted on the periphery of the rotor to swing about axes parallel to its axis and to project radially therefrom in response to centrifugal force, the distance between said path and axis being such that the hammers strike such piece glancing blows as it is transported past the rotor by the carrier, the rotor having a series of recesses disposed in rows extending lengthwise of said axis to receive the pivoted ends of the hammers, and the recesses of each row being staggered with respect to the recesses of other rows, the rotor also having a cushion socket behind the inner end of each hammer, a cushion in each socket yieldingly to limit return swing of the hammer to its radial position, and a striker interposed between the hammer and cushion to distribute blows of the hammer's inner end over the end of the cushion, each socket being wider than the associated hammer to accommodate a larger cushion, said recesses being disposed between planes perpendicular to the axis of the rotor with at least one recess between each pair of adjacent planes, the width of the recesses being substantially equal to the distance between planes and the width of the hammers being substantially equal to that of the recesses so that the hammers strike such piece throughout substantially the entire length of the rotor, and the inner end of each hammer may be as wide as its outer end.

References Cited in the file of this patent

UNITED STATES PATENTS

| | | |
|---|---|---|
| 1,046,130 | Widdis | Dec. 3, 1912 |
| 1,951,084 | Council | Mar. 13, 1934 |
| 2,005,799 | Nicholson et al. | June 25, 1935 |
| 2,397,490 | Kenney | Apr. 2, 1946 |
| 2,436,555 | Daniell | Feb. 24, 1948 |
| 2,608,223 | Eklund et al. | Aug. 26, 1952 |
| 2,608,224 | Eklund et al. | Aug. 26, 1952 |
| 2,653,635 | Denison | Sept. 29, 1953 |
| 2,733,742 | Bedard | Feb. 7, 1956 |